United States Patent
Leistensnider et al.

(10) Patent No.: US 7,272,578 B1
(45) Date of Patent: Sep. 18, 2007

(54) METHOD AND SYSTEM FOR CREATING A PORTFOLIO OF STOCK EQUITIES BASED ON MARKET CAPITALIZATION AND SALES

(75) Inventors: James Leistensnider, Wayne, PA (US); Thomas Loop, Scotch Plains, NJ (US)

(73) Assignee: The Prudential Insurance Company of America, Newark, NJ (US)

( * ) Notice: Subject to any disclaimer, the term of this patent is extended or adjusted under 35 U.S.C. 154(b) by 1582 days.

(21) Appl. No.: 09/373,786

(22) Filed: Aug. 13, 1999

Related U.S. Application Data

(63) Continuation-in-part of application No. 09/182,466, filed on Oct. 30, 1998, now Pat. No. 6,839,685.

(51) Int. Cl.
*G06Q 40/00* (2006.01)
(52) U.S. Cl. .................... 705/36 R; 705/37
(58) Field of Classification Search ............ 705/30–42, 705/44
See application file for complete search history.

(56) References Cited

U.S. PATENT DOCUMENTS

| | | | | |
|---|---|---|---|---|
| 5,297,032 A | * | 3/1994 | Trojan et al. ............... | 705/37 |
| 5,819,238 A | * | 10/1998 | Fernholz ..................... | 705/36 |
| 5,946,666 A | * | 8/1999 | Nevo et al. .................. | 705/36 |
| 5,978,778 A | * | 11/1999 | O'Shaughnessy ........... | 705/36 |
| 6,061,663 A | * | 5/2000 | Bloom et al. ................. | 705/36 |
| 6,064,985 A | * | 5/2000 | Anderson ..................... | 705/36 |

OTHER PUBLICATIONS

Charles Schwab: Schwab introduces Analytics Fund; utilizes quantitative techniques to seek above-market returns, Business Wire, May 21, 1996.*

* cited by examiner

*Primary Examiner*—Frantzy Poinvil
(74) *Attorney, Agent, or Firm*—Rothwell, Figg, Ernst & Manbeck, P.C.

(57) ABSTRACT

A computer-implemented method and system for selecting stock equities for inclusion in a strategic investment portfolio includes identifying stocks making up a preselected index and analyzing the stocks for market capitalization and sales, according to predetermined criteria selected according to the investment strategy. A sorted list of acceptable stocks is then created from which the portfolio is assembled.

9 Claims, 2 Drawing Sheets

METHOD AND SYSTEM FOR CREATING A PORTFOLIO OF STOCK EQUITIES BASED ON MARKET CAPITALIZATION AND SALES

CROSS-REFERENCE TO RELATED APPLICATION

The present application is a continuation-in-part of application Ser. No. 09/182,466, filed Oct. 30, 1998 now U.S. Pat. No. 6,839,685.

BACKGROUND OF THE INVENTION

1. Field of the Invention

The present invention relates generally to computer-implemented methods and systems for performing analysis of information contained in a database according to a particular set of preselected parameters and obtaining a result based on such analysis. More particularly, the present invention relates to a computer-implemented method and system for creating a portfolio of stock equities by processing information contained in a database using a set of strategic factors so as to obtain a portfolio of strategically selected stocks reflecting a specific investment strategy.

2. Background and Conventional Art

In the securities field, financial analysts perform the task of following the operations and condition of companies whose common stock is sold to the public. Typically, in order to gain expertise, such analysts focus on particular economic sectors. Examples of such economic sectors are the entertainment sector, the personal services sector, the telecommunications sector, the automobile sector, and the information services sector.

An investor wishing to invest in stocks may purchase the stock of individual companies, or may purchase shares in mutual funds or units in an equity trust. While the potentially large gains from ownership of the stock of any one individual company are usually accompanied by an equally large risk of loss, investment in mutual funds or equity trusts seeks to reduce risk while maintaining a relatively high potential for gain.

Conventionally, the composition of an equity trust or mutual fund portfolio is a result of continuous analysis by many securities analysts employed by the mutual fund or sponsor of the equity trust. While the securities recommended for investment may be chosen based on an articulated objective, it is to be expected that a significant amount of subjectivity and divergence of opinion may arise in arriving at recommended securities for inclusion in the equity trust or mutual fund. Additionally, arriving at a consensus requires many hundreds of hours of human effort in collecting, reviewing, studying and analyzing information.

There thus exists a need in the art for a computer-implemented method and system for creating a portfolio of equities based on a specific strategy consisting of specifically defined parameters and which can be implemented automatically and efficiently by analyzing information contained in a database in accordance with the predefined parameters to obtain an investment portfolio containing stocks satisfying the investment objective by meeting the requirements of the selected parameters.

SUMMARY OF THE INVENTION

The present invention solves the above-mentioned need, by providing a computer-implemented method and system for creating a portfolio of stock equities for investment, based on an investment objective defined by specific preselected parameters.

In particular, according to one preferred embodiment, the invention provides a computer-implemented method for creating a portfolio of equity stocks, comprising the steps of determining the composition of a predetermined broad based stock index by accessing a database and creating a list of the stocks making up said index; obtaining from said database for each stock in said index, data relating to at least market capitalization and sales of the company issuing the stock; creating an acceptable stock list by at least eliminating from said index list stocks having a market capitalization below a predetermined value; and sorting the acceptable list of stocks by sales and placing into said portfolio, until a predetermined number of stocks are reached, a stock having the highest sales of said remaining list.

According to other aspects of the invention, a computer-implemented system and a computer program product are provided for creating an investment portfolio in accordance with the features of the method described above.

BRIEF DESCRIPTION OF THE DRAWINGS

The present invention will become more fully understood from the following detailed description in conjunction with the accompanying drawings, in which.

DETAILED DESCRIPTION OF THE PREFERRED EMBODIMENTS

Figure 1:
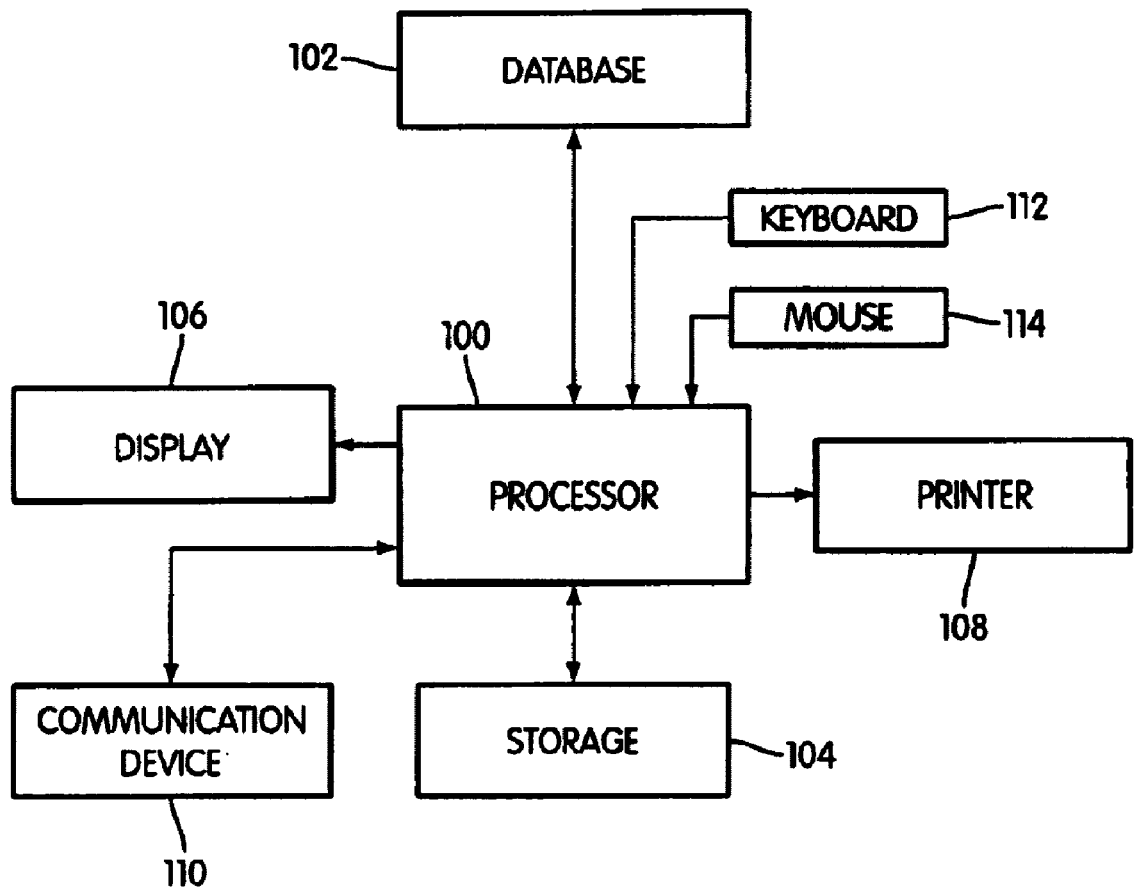
FIG. 1 is a block diagram of a computer system according to one preferred embodiment of the present invention.

Referring to FIG. 1, a computer-based system according to the present invention includes a data processor 100, a database 102, a storage medium 104 such as a floppy disk, a hard disk, a magnetic tape, an optical disk, or the like, a display 106 such as a CRT, a printer 108, and a communication device 110 such as a modem or network server. A keyboard device 112 and mouse input device 114 are also provided.

The storage 104 contains a computer program product containing computer-readable code, which when loaded into the processor causes the processor to perform a process which creates an investment portfolio according to the method of the invention, which is described in detail below. Once the portfolio has been created, the results can be displayed on the display 106, printed on the printer 108, or communicated to a remote server, workstation or personal computer through the communication device 110.

Figure 2:
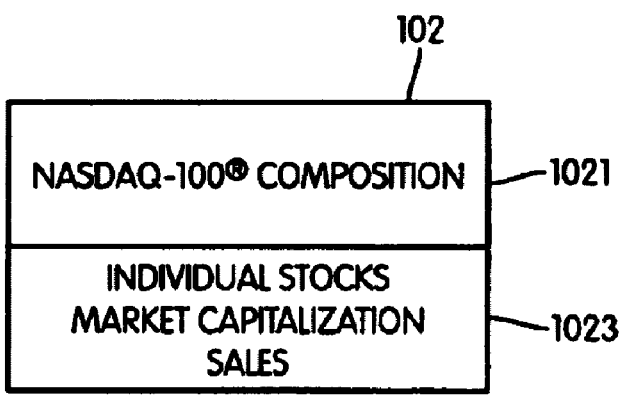
FIG. 2 is a diagram illustrating the composition of database 102 of FIG. 1.

FIG. 2 illustrates the structure of the database 102 according to a preferred embodiment of the invention. The database contains a listing 1021 of the composition of a broad based stock index such as, for example, the Nasdaq-100 Index@, and, for each individual stock listed, a record 1023 containing at least the market capitalization of the company (which is equal to the closing price multiplied by the total number of outstanding shares), as well as the company sales (which is equal to the sum of the quarterly sales for the most recent four quarters reported by the company).

Figure 3:
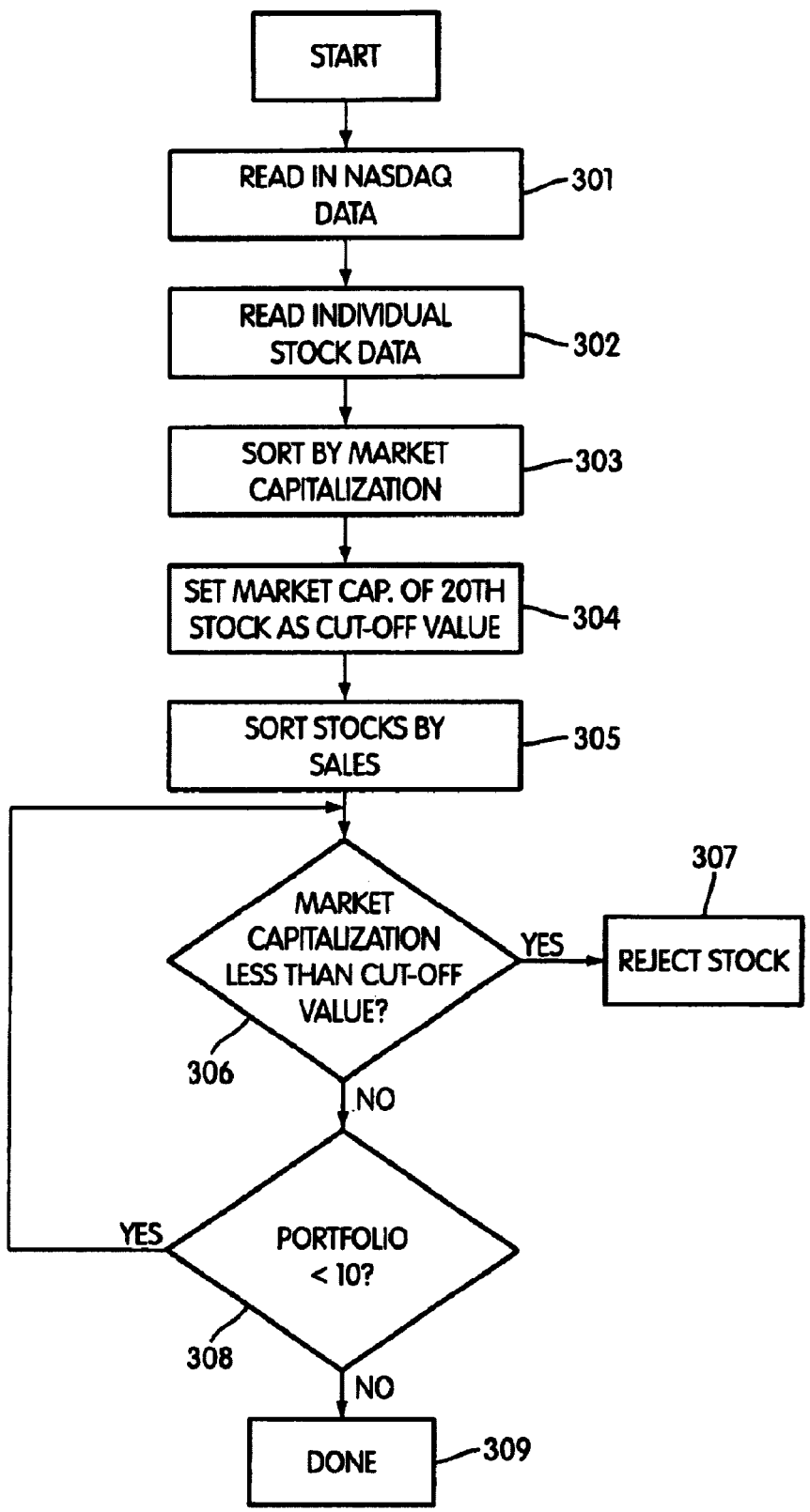
FIG. 3 is a flow diagram illustrating a computer-implemented method according to a preferred embodiment of the invention.

FIG. 3 illustrates a flow diagram of a preferred embodiment of a method according to the present invention. At step 301, the computer reads into memory the composition of the broad based stock index from list 1021, to create a running list of potential candidates for inclusion into the portfolio. At step 302, the individual stock data is read from record 1023 for each stock in the broad based stock index. The method proceeds to step 303, wherein the market capitalization values of the 100 stocks are determined, and the stocks are sorted by market capitalization. At step 304, the market capitalization of the 20th stock is set as a cut-off value for accepting stocks into the portfolio. In particular, assuming all other criteria are met, a stock will not be accepted unless its market capitalization is within the top 20 percent of the Nasdaq-100.

At step 305, the stocks in the running list are sorted by sales. At step 306, the market capitalization of the stock at the top of the list is compared with the previously determined cut-off value. If the market capitalization of the stock is less than the cut-off value, the stock is rejected at step 307.

At step 308, the stock is accepted, and the number of stocks in the portfolio is determined. If there are less than 10 stocks in the portfolio, the process returns to step 306 where the next stock from the top of the list is examined for market capitalization before being accepted into the portfolio. Once the portfolio reaches the preselected number (10 in the preferred embodiment), the process ends at step 309.

The invention having been thus disclosed, it will become apparent to those skilled in the art that the same may be varied in many ways without departing from the spirit and scope of the invention. Any and all such modifications are intended to be included within the scope of the following claims.

What is claimed is:

1. A computer-implemented method for creating a portfolio of equity stocks, comprising the steps of:
    determining the composition of a predetermined broad based stock index by accessing a database and creating a list of the stocks making up said index;
    obtaining from said database for each stock in said index, data relating to at least market capitalization and sales of the company issuing the stock;
    sorting said index list by market capitalization and setting the lowest market capitalization among a predetermined number of stocks in said sorted index list as a predetermined value; and
    sorting said index list by sales and placing into said portfolio, until a predetermined number of stocks are reached, a stock having the highest sales of said sales-sorted list and having a market capitalization not less than said predetermined value.

2. The computer-implemented method of claim 1, wherein said predetermined value of said market capitalization is the top twenty percent of said broad based stock index.

3. The computer-implemented method of claim 1, wherein said broad based stock index is the Nasdaq-100 Index.

4. A computer-implemented system for creating a portfolio of equity stocks, comprising:
    a database containing information pertaining to individual stocks, and information pertaining to the identity of stocks making up a known stock index;
    means for determining the composition of a predetermined broad based stock index by accessing said database and creating a list of the stocks making up said index;
    means for obtaining from said database for each stock in said index, data relating to at least market capitalization and sales of the company issuing the stock;
    means for sorting said index list by market capitalization and setting the lowest market capitalization among a predetermined number of stocks in said sorted index list as a predetermined value; and
    means for sorting said index list by sales and placing into said portfolio, until a predetermined number of stocks are reached, a stock having the highest sales of said sales-sorted list and having a market capitalization not less than said predetermined value.

5. The computer-implemented system of claim 4, wherein said predetermined value of said market capitalization is the top twenty percent of said broad based stock index.

6. The computer-implemented system of claim 4, wherein said broad based stock index is the Nasdaq-100 Index.

7. A computer program product having computer-readable code stored on a computer-readable storage medium, said computer readable code comprising:
    instruction for determining the composition of a predetermined broad based stock index by accessing a database and creating in a computer in which said code is programmed a list of the stocks making up said index;
    instruction for obtaining from said database for each stock in said index, data relating to at least market capitalization and sales of the company issuing the stock;
    instruction for sorting said index list by market capitalization and setting the lowest market capitalization among a predetermined number of stocks in said sorted index list as a predetermined value; and
    instruction for sorting said index list by sales and placing into said portfolio, until a predetermined number of stocks are reached, a stock having the highest sales of said sales-sorted list and having a market capitalization not less than said predetermined value.

8. The computer program product of claim 7, wherein said predetermined value of said market capitalization is the top twenty percent of said broad based stock index.

9. The computer program product of claim 7, wherein said broad based stock index is the Nasdaq-100 Index.

* * * * *